(12) United States Patent
Vakilian et al.

(10) Patent No.: US 11,507,119 B2
(45) Date of Patent: Nov. 22, 2022

(54) METHOD AND APPARATUS FOR INTEGRATED BATTERY SUPPLY REGULATION AND TRANSIENT SUPPRESSION

(71) Applicant: Avago Technologies International Sales Pte. Limited, Singapore (SG)

(72) Inventors: Kambiz Vakilian, Irvine, CA (US); Jan Westra, Bunnik (NL); Dmitrii Loukianov, Irvine, CA (US); Vikrant Dhamdhere, Irvine, CA (US); Jingguang Wang, Irvine, CA (US)

(73) Assignee: Avago Technologies International Sales PTE. Limited, Singapore (SG)

( * ) Notice: Subject to any disclaimer, the term of this patent is extended or adjusted under 35 U.S.C. 154(b) by 204 days.

(21) Appl. No.: 16/530,547

(22) Filed: Aug. 2, 2019

(65) Prior Publication Data

US 2020/0050224 A1 Feb. 13, 2020

Related U.S. Application Data

(60) Provisional application No. 62/718,243, filed on Aug. 13, 2018.

(51) Int. Cl.
*G05F 1/56* (2006.01)
*H02H 9/04* (2006.01)

(52) U.S. Cl.
CPC ............... *G05F 1/56* (2013.01); *H02H 9/046* (2013.01)

(58) Field of Classification Search
USPC .... 323/222, 312, 234, 271–289; 363/15, 18, 363/21.07, 21.13, 21.15
See application file for complete search history.

(56) References Cited

U.S. PATENT DOCUMENTS

| | | | | |
|---|---|---|---|---|
| 4,088,941 | A | * 5/1978 | Wheatley, Jr. | G05F 1/613 323/226 |
| 4,437,146 | A | * 3/1984 | Carpenter | H02M 1/4225 323/222 |
| 5,072,169 | A | 12/1991 | Saul et al. | |
| 5,446,367 | A | * 8/1995 | Pinney | G05F 3/205 323/266 |
| 6,087,815 | A | * 7/2000 | Pfeifer | B25F 5/00 323/282 |
| 6,118,254 | A | * 9/2000 | Faulk | H02J 7/0068 320/128 |
| 6,127,815 | A | * 10/2000 | Wilcox | H02M 3/156 323/282 |

(Continued)

OTHER PUBLICATIONS

Martins, M. M.; Dias, J. A. S.: CMOS shunt regulator with bandgap reference for automotive environment. In: IEE Proceedings—Circuits, Devices and Systems, vol. 141, 1994, No. 3, S. 157-161.

*Primary Examiner* — Kevin J Comber
*Assistant Examiner* — Nusrat Quddus
(74) *Attorney, Agent, or Firm* — Foley & Lardner LLP

(57) ABSTRACT

In some aspects, the disclosure is directed to methods and systems for providing voltage regulation and transient suppression from a battery to an integrated circuit. A resistor between a source power supply and the integrated circuit may dissipate power and reduce the voltage at the integrated circuit's input, with current through the resistor under control of an internal regulator of the integrated circuit.

20 Claims, 3 Drawing Sheets

(56) References Cited

U.S. PATENT DOCUMENTS

| | | | | |
|---|---|---|---|---|
| 6,134,130 A | * | 10/2000 | Connell | G06K 19/0701 363/89 |
| 6,424,148 B1 | * | 7/2002 | Burns | G01P 3/487 318/653 |
| 6,570,746 B1 | * | 5/2003 | Smith | H02J 7/0036 320/127 |
| 6,750,797 B1 | * | 6/2004 | Gunther | G05F 1/56 341/144 |
| 6,806,693 B1 | * | 10/2004 | Bron | G05F 1/575 323/280 |
| 7,196,501 B1 | * | 3/2007 | Dunipace | G05F 1/565 323/270 |
| 7,330,364 B2 | * | 2/2008 | Lynch | H02M 7/2176 363/125 |
| 7,696,740 B2 | * | 4/2010 | Zhou | G05F 1/56 323/288 |
| 7,973,521 B2 | * | 7/2011 | Chen | G05F 1/56 323/273 |
| 8,008,898 B2 | * | 8/2011 | Melanson | H02M 3/156 323/222 |
| 9,257,905 B1 | * | 2/2016 | Kotikalapoodi | H05B 45/38 |
| 9,823,678 B1 | * | 11/2017 | Lin | H03F 3/45475 |
| 10,146,284 B2 | * | 12/2018 | Petrovic | G06F 1/3287 |
| 10,234,883 B1 | * | 3/2019 | Du | G05F 1/614 |
| 10,340,790 B1 | * | 7/2019 | Yasuhara | H02M 1/15 |
| 10,488,876 B1 | * | 11/2019 | Jackum | G05F 1/565 |
| 2002/0041178 A1 | * | 4/2002 | Hiraki | G06F 1/32 323/272 |
| 2004/0080886 A1 | * | 4/2004 | Ishikawa | H02M 3/156 361/62 |
| 2004/0104711 A1 | * | 6/2004 | Scoones | G05F 1/56 323/280 |
| 2004/0174149 A1 | * | 9/2004 | Agari | G05F 1/565 323/271 |
| 2004/0220758 A1 | * | 11/2004 | Barsoukov | G01R 31/3828 702/63 |
| 2005/0052168 A1 | * | 3/2005 | Tazawa | H02M 3/1584 323/282 |
| 2006/0113972 A1 | * | 6/2006 | Mihara | G05F 1/575 323/273 |
| 2006/0273777 A1 | * | 12/2006 | Suzuki | G05F 1/575 323/312 |
| 2007/0206338 A1 | * | 9/2007 | Ishino | G05F 1/575 361/93.9 |
| 2009/0039847 A1 | * | 2/2009 | Michallick | G05F 1/565 323/280 |
| 2009/0243564 A1 | * | 10/2009 | Kajita | G01R 19/16542 323/234 |
| 2009/0256547 A1 | * | 10/2009 | Akyildiz | H02J 9/005 323/350 |
| 2009/0295228 A1 | * | 12/2009 | Ochi | H02M 3/156 307/66 |
| 2010/0033144 A1 | * | 2/2010 | Chen | G05F 1/56 323/280 |
| 2010/0039836 A1 | * | 2/2010 | Gong | H02M 3/33507 363/21.13 |
| 2010/0144402 A1 | * | 6/2010 | Watanabe | G06K 19/0723 455/572 |
| 2010/0169037 A1 | * | 7/2010 | Hopkins | G11C 29/50 702/117 |
| 2011/0156686 A1 | * | 6/2011 | Gakhar | G05F 1/565 323/284 |
| 2011/0193539 A1 | * | 8/2011 | Schmidt | H02M 3/156 323/282 |
| 2011/0221424 A1 | * | 9/2011 | McNamara | G01R 1/203 324/126 |
| 2011/0222313 A1 | * | 9/2011 | Ueno | H02M 1/36 363/15 |
| 2012/0120699 A1 | * | 5/2012 | Watanabe | G06K 19/0723 363/127 |
| 2012/0194151 A1 | * | 8/2012 | Gunther | H02M 3/156 323/282 |
| 2013/0027986 A1 | * | 1/2013 | Atrash | H02M 3/33507 363/21.07 |
| 2014/0218827 A1 | * | 8/2014 | Inukai | G06F 1/26 361/18 |
| 2014/0266105 A1 | * | 9/2014 | Li | G05F 1/565 323/280 |
| 2014/0362655 A1 | * | 12/2014 | Umeda | H03L 5/00 365/227 |
| 2015/0349651 A1 | * | 12/2015 | Morota | H02M 3/33523 363/21.15 |
| 2016/0048148 A1 | * | 2/2016 | Lee | G05F 1/575 323/280 |
| 2016/0147240 A1 | * | 5/2016 | Lan | G05F 1/565 323/280 |
| 2016/0154415 A1 | * | 6/2016 | B z itu | G05F 1/575 323/280 |
| 2017/0102752 A1 | * | 4/2017 | Varma | G06F 9/4893 |
| 2017/0131735 A1 | * | 5/2017 | Balteanu | G05F 3/262 |
| 2017/0344040 A1 | * | 11/2017 | Matsumoto | G05F 1/56 |
| 2018/0152099 A1 | * | 5/2018 | Savic | H02M 3/156 |
| 2018/0368221 A1 | * | 12/2018 | Johnson | H05B 45/00 |
| 2019/0384339 A1 | * | 12/2019 | Pelicia | G05F 1/00 |
| 2020/0106081 A1 | * | 4/2020 | Suzuki | B25F 5/00 |

* cited by examiner

METHOD AND APPARATUS FOR INTEGRATED BATTERY SUPPLY REGULATION AND TRANSIENT SUPPRESSION

RELATED APPLICATIONS

The present application claims the benefit of and priority to U.S. Provisional Application No. 62/718,243, entitled "Method and Apparatus for Integrated Battery Supply Regulation," filed Aug. 13, 2018, the entirety of which is incorporated by reference herein.

FIELD OF THE DISCLOSURE

This disclosure generally relates to systems and methods for power regulation. In particular, this disclosure relates to systems and methods for voltage and current regulation in battery-powered devices.

BACKGROUND OF THE DISCLOSURE

In many implementations of mobile and/or automotive systems, integrated circuits are supplied power via external batteries. In some implementations, the external batteries may have voltages that are not necessarily compliant with modern integrated circuit technologies. For example, many automotive batteries have 12 volt outputs, but modern processors typically require lower input voltages, such as 5 volts, 3.3 volts, 2.5 volts, 1.8 volts, etc. Additionally, many external battery supplies can have high amplitude transient outputs that can damage sensitive integrated circuits.

To remove transients and regulate power for integrated circuits or other devices, some systems may utilize expensive and large components for filtering and voltage regulation. Aside from adding to manufacturing costs, such implementations may also limit how small the integrated circuits or other on-board components may be. For example, large on-board regulators may be needed in some implementations to reduce input voltage applied to more sensitive components, requiring additional isolation and increased power dissipation, potentially large heat sinks, etc., and adding significant cost and size.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

In many implementations of mobile and/or automotive systems, integrated circuits are supplied power via external batteries. In some implementations, the external batteries may have voltages that are not necessarily compliant with modern integrated circuit technologies. For example, many automotive batteries have 12 volt outputs, but many circuits manufactured by modern processes typically require lower input voltages, such as 5 volts, 3.3 volts, 2.5 volts, 1.8 volts, etc. Similarly, many integrated circuits may have operating voltage limits due to circuit element sizes and heat dissipation capabilities that may be an order of magnitude or more less than the voltage provided by large power supplies. For example, a lower power integrated circuit may be constructed with smaller circuit elements or narrower paths that cannot handle higher currents, or paths that are closer together such that high voltages may cause currents to jump between paths. Accordingly, many such devices may require lower input voltages than may be provided by external supplies.

Additionally, many external battery supplies can have high amplitude transient outputs that can damage sensitive integrated circuits. This may particularly be the case with the automotive environments, which typically require batteries capable of large current outputs, limiting the amount of internal filtering that may be applied.

To remove transients and regulate power for integrated circuits or other devices, some systems may utilize expensive and large components for filtering and voltage regulation. Aside from adding to manufacturing costs, such implementations may also limit how small the integrated circuits or other on-board components may be. For example, large on-board regulators may be needed in some implementations to reduce input voltage applied to more sensitive components, requiring additional isolation and increased power dissipation, potentially large heat sinks, etc., and adding significant cost and size.

Figure 1:
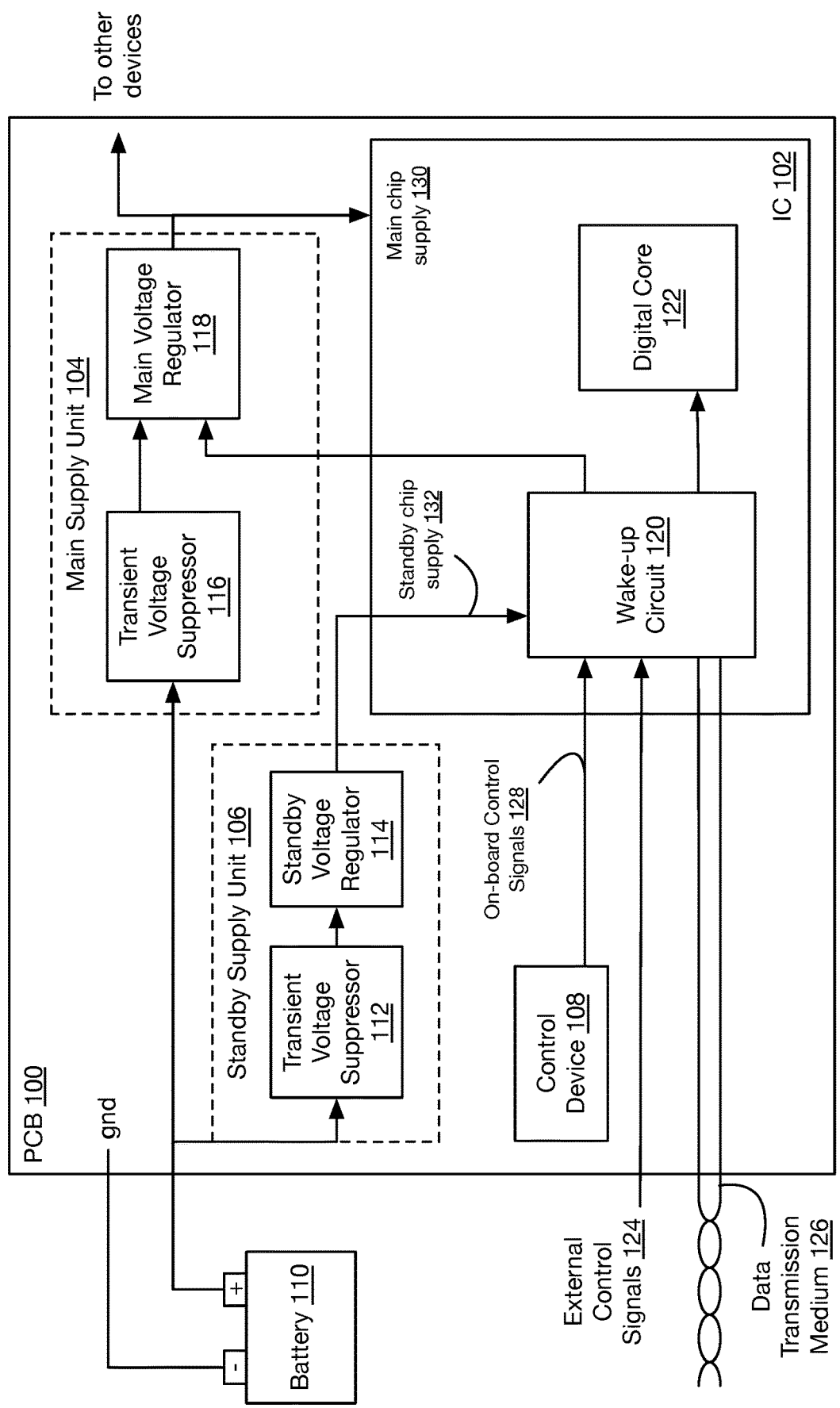
FIG. 1 is a block diagram of an implementation of power regulation and filtering for an integrated circuit.

For example, referring first to FIG. 1, illustrated is a block diagram of an implementation of power regulation and filtering for an integrated circuit. An external battery 110, such as an automotive battery, may supply power to a printed circuit board (PCB) 100 including an integrated circuit (IC) 102. The integrated circuit 102 may comprise a processor, memory, communications interface, input/output interfaces, or any other type and form of device or devices, referred to as a digital core 122, and may communicate with external devices in many implementations. The integrated circuit 102 may be supplied power via a main supply unit 104 and, in many implementations, a standby supply unit 106 (e.g. main chip supply 130 and standby chip supply 132).

Each of main supply unit 104 and standby supply unit 106 may comprise a transient voltage suppressor (112, 116) and a voltage regulator (114, 118). The transient voltage suppressor(s) may comprise inductive and/or capacitive filters to suppress high amplitude transients from the battery 110, which may on the order of tens of volts for periods of several milliseconds. The filtered output(s) may be provided to the voltage regulator(s), which may each comprise a linear or switching power supply that reduces the incoming voltage to a stable supply voltage 130, 132 for the IC 102 and other devices, typically on the order of 2.5-3.3 volts in many implementations.

To reduce power consumption when the vehicle or device is not in use, in many implementations, the main supply unit 104 may be disabled or turned off, with the main voltage regulator 118 not providing a power output. In such implementations, the standby supply unit 106 may supply power to a wake-up circuit 120, which may receive control signals from local 'on-board' control devices 108 (e.g. control signal 128), and/or external devices (e.g. via external control signals 124 or wireless transmissions 126). The standby supply unit 106 may provide a small amount of current to the wake-up circuit 120, which may monitor control signals 124-128. Upon receipt of a wake-up request or similar control signal from an external source or on-board control device 108, the wake-up circuit 120 may enable or power up the main supply unit 104 and main voltage regulator 118 to provide main chip supply 130 (as well as power to other devices, e.g. digital core 122). The wake-up circuit 120 may have a very low power dissipation (e.g. with current on the order of tens of micro-amps), such that very little power is consumed by IC 102 prior to enabling main supply unit 104.

The transient voltage suppressor 112 and standby voltage regulators 114 may be relatively expensive components and take up significant space on PCB 100, despite only providing a small amount of power to wake-up circuit 120. Additionally, they may be constructed using a larger process (e.g. larger circuit elements and interconnections) than IC 102, such that they cannot be directly integrated on the same IC 102 (which may not be able to handle the higher voltages at the input of voltage suppressor 112 and voltage regulator 114). Accordingly, in some implementations, replacing these components with smaller and less expensive on-board devices may provide important cost and size savings compared to conventional systems.

Figure 2A:
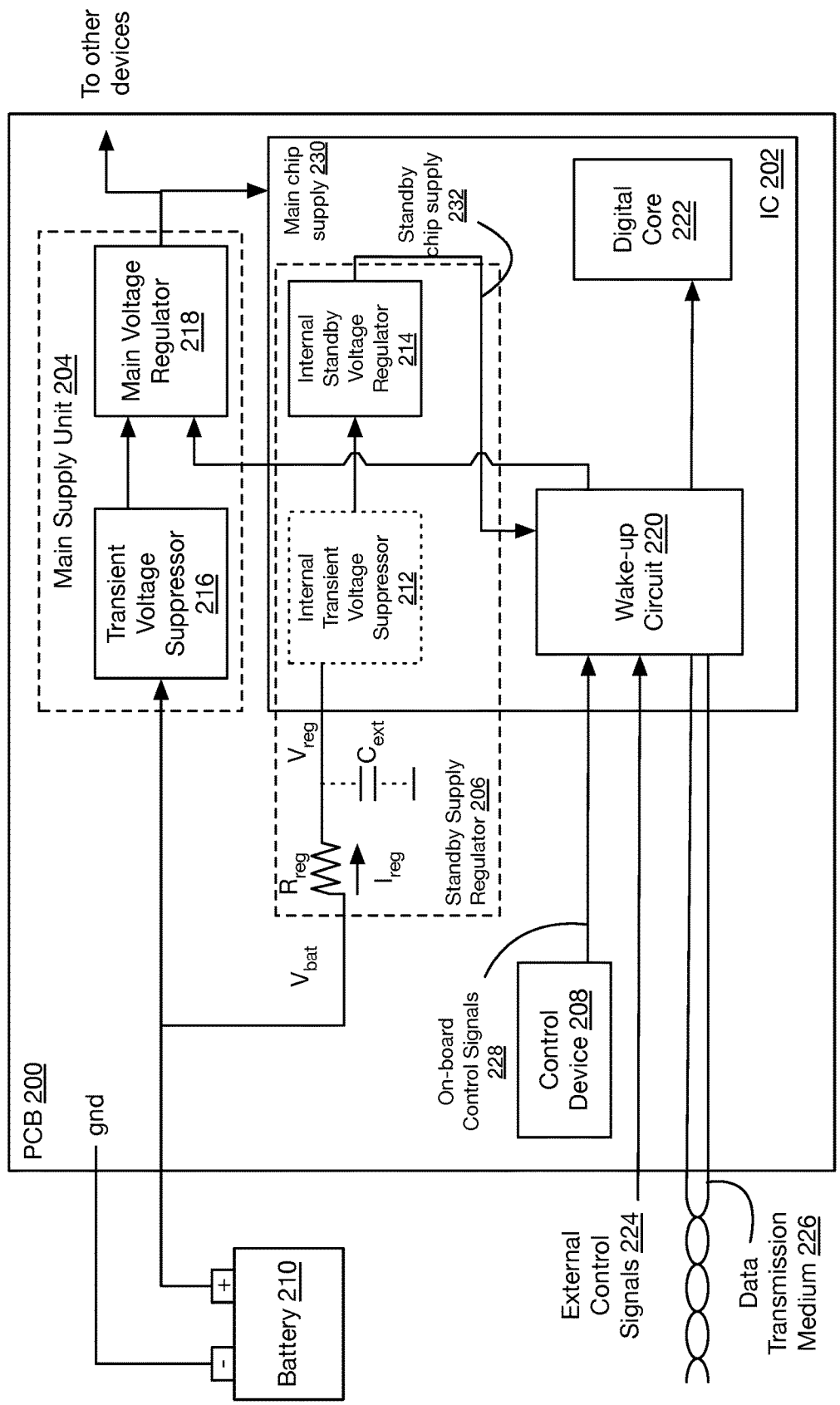
FIG. 2A is a block diagram of an implementation of integrated power regulation and filtering for an integrated circuit.

FIG. 2A is a block diagram of an implementation of integrated power regulation and filtering for an integrated circuit. A resistor ($R_{reg}$), external to IC 202, may provide a reduced input voltage ($V_{reg}$) to the IC under control of an internal standby voltage regulator 214. The standby voltage regulator 214, which may be unable to handle the input voltage from the power supply, may control $V_{reg}$ by regulating current through the resistor $R_{reg}$ (e.g. $I_{reg}$), such that the input voltage $V_{reg}$ is equal to a pre-determined value. The voltage regulator 214, which may comprise a shunt voltage regulator in some implementations, may provide a predetermined and stable output voltage to the wake-up circuit 220 (e.g. standby chip supply 232). In some implementations, an external shunt capacitor ($C_{ext}$) may be used to suppress extreme transients from the external supply (shown with dotted line connection as optional, in some implementations). In some implementations, a secondary small internal transient voltage suppressor 212 may be included to further suppress transient voltages (shown with dotted lines as optional, in some implementations).

Figure 2B:
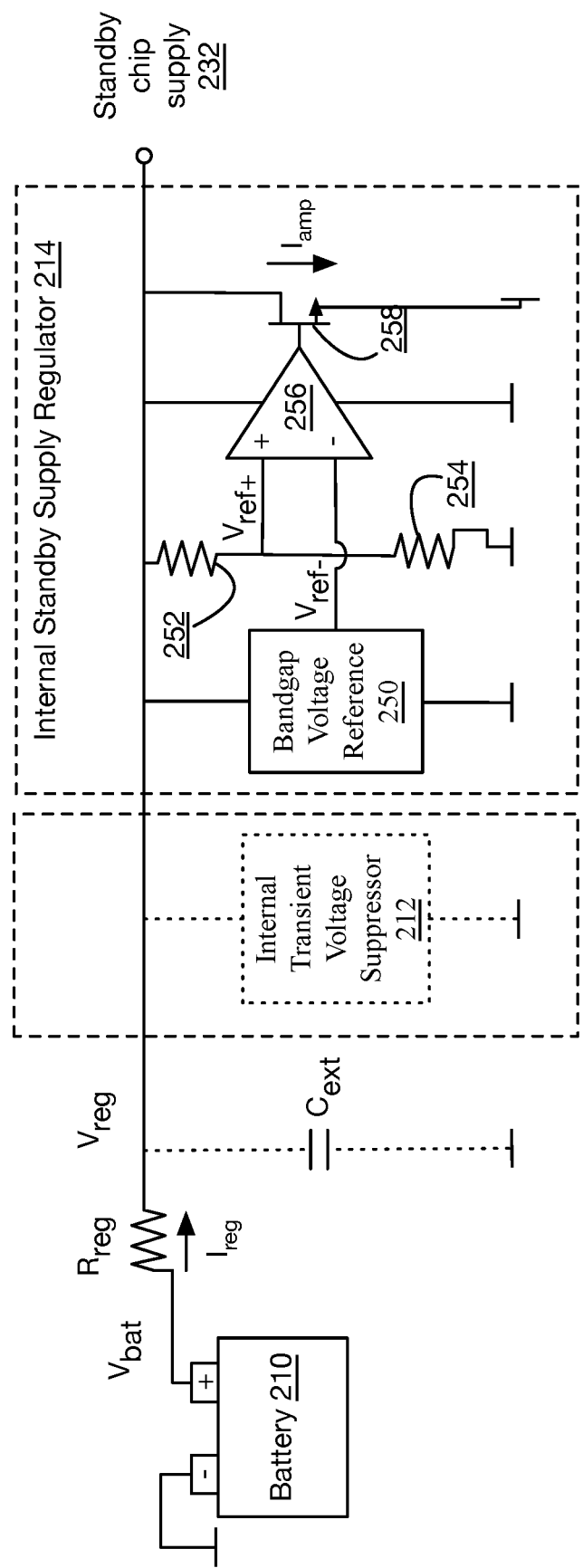
FIG. 2B is a block diagram of an implementation of a standby supply regulator for an integrated circuit.

FIG. 2B is a block diagram of an implementation of a standby supply regulator for an integrated circuit. As discussed above, power from external battery 210 is provided to a resistor ($R_{reg}$). Current flow through the resistor $I_{reg}$ may be controlled by the internal standby supply regulator 214, causing a drop in voltage through the resistor (i.e., $V_{bat}-V_{reg}$, or $R_{reg}*I_{reg}$). For example, in some implementations, the current flow $I_{reg}$ may be increased to cause a larger voltage drop in the resistor, reducing $R_{reg}$. Similarly, in some implementations, the current flow $I_{reg}$ may be decreased to cause a smaller voltage drop in the resistor, increasing $R_{reg}$. In some implementations, an external shunt capacitor $C_{ext}$ (which may be referred to as a shunt capacitor, shunt filter, high pass filter, or by similar terms) and/or an internal transient voltage suppressor 212 may provide additional transient filtering (in some implementations, $C_{ext}$ may also be placed prior to the resistor $R_{reg}$, although this may require a capacitor with a higher voltage limit). The suppressor 212 may comprise one or more diodes or clamp circuits to ground or the voltage supply rail, to prevent large amplitude positive or negative voltage excursions or deviations, and may be part of an electrostatic discharge protection circuit for the integrated circuit.

In some implementations, internal standby supply regulator 214 may comprise a bandgap voltage reference circuit 250. The bandgap voltage reference circuit 250 may provide a constant voltage $V_{ref}$—regardless of temperature or battery output variation, which may be a predetermined voltage (e.g. 1.2V, 1.5V, or any similar amplitude). In some implementations, other reference circuits may be utilized, such as Zener diode references, albeit with potentially lower accuracy and/or higher power dissipation and heat.

The filtered supply voltage $V_{reg}$ may be divided via a voltage divider (resistors 252, 254) down to a similar amplitude $V_{ref+}$, and $V_{ref-}$ and $V_{ref+}$ may be input to amplifier 256. Differential amplifier 256 may compare the two voltages and provide an output voltage to transistor 258 according to their difference to adjust the current $I_{amp}$, such that the divided version of the regulated supply $V_{ref+}$ is equal to the bandgap voltage $V_{ref-}$. The bandgap voltage reference 250 thus provides a reference to the same supply that it utilizes.

Accordingly, the external resistor may provide a voltage drop that reduces the input voltage down to $V_{reg}$ for utilization by the wake up circuit. The wake up circuit may use a small amount of current at all times in order to maintain a monitoring state for input control signals, such as 5 microamps. The current $I_{amp}$ through the voltage regulator may be drawn in parallel with the current to the wake up circuit (e.g. 35 microamps), referred to here as $I_{(wake\ up\ circuit)}$, such that the total current through the resistor (e.g. $I_{reg}=I_{amp}+I_{(wake\ up\ circuit)}$) may be fixed (e.g. 40 microamps). If the current required by the wake up circuit is increased or decreased (e.g. due to ambient temperature changes, for example), $I_{amp}$ is respectively decreased or increased such that $I_{reg}$, and the corresponding voltage drop through the external resistor, is constant. For example, if the current drawn by the wake up circuit is increased to 10 microamps, the current $I_{amp}$ may be decreased to 30 microamps, resulting in the total $I_{reg}$ remaining the same at 40 microamps, and $V_{reg}$ (equal to $V_{bat}-I_{reg}*R_{reg}$) similarly remaining the same. In some implementations, transistor 258 may be referred to as a current bypass shunt, and may comprise any type and form of transistor, in various implementations (e.g. Bipolar Junction Transistor, JFET, MOSFET, etc.).

The systems and methods discussed herein thus provide for current-controlled voltage regulation at very low voltages relative to the source voltage from an external supply, while utilizing circuit elements (other than $R_{reg}$) that may be very small and low cost and integrated with or manufactured using the same process as other low voltage components of the IC 202. These implementations cannot be readily integrated with conventional systems using an external voltage regulator, as placing a resistor between an external supply and an external voltage regulator (e.g. standby voltage regulator 114 of FIG. 1) would impair the operation of the external voltage regulator, which requires as little resistance as possible between the external supply and the external voltage regulator for efficiency; higher resistances, such as $R_{reg}$, would result in significant power consumption through the resistor, and preventing proper operation of the external voltage regulator.

Thus, in one aspect, the present disclosure is directed to a system for integrated battery supply regulation. The system includes a standby supply regulator configured to receive an input voltage from a power supply and provide an output voltage to an integrated circuit, wherein a first portion of the standby supply regulator is external to the integrated circuit and a second portion of the standby supply regulator is internal to the integrated circuit.

In some implementations, the second portion of the standby supply regulator comprises a shunt voltage regulator. In some implementations, the second portion of the standby supply regulator is configured to adjust current flow through the first portion of the standby supply regulator. In a further implementation, the second portion of the standby supply regulator is configured to increase current flow through the first portion of the standby supply regulator to reduce the output voltage to the integrated circuit. In another further implementation, the second portion of the standby supply regulator is configured to decrease current flow through the first portion of the standby supply regulator to increase the output voltage to the integrated circuit. In still another further implementation, a first portion of the current flow through the first portion of the standby supply regulator is provided to the integrated circuit, and a second portion of the current flow through the standby supply regulator is provided to the second portion of the standby supply regulator. In a still yet further implementation, the second portion of the standby supply regulator is configured to adjust the second portion of the current flow through the standby supply regulator. In another further implementation, the first portion of the standby supply regulator comprises a resistor. In a still further implementation, the resistor is configured to dissipate an amount of power proportional to a difference between the input voltage and the output voltage.

In some implementations, the second portion of the standby supply regulator comprises a voltage reference circuit and a voltage divider, and a differential amplifier. In a further implementation, the second portion of the standby supply regulator further comprises a current bypass shunt controlled by the differential amplifier.

In some implementations, the system includes a high pass filter connected to the first portion of the standby supply regulator. In a further implementation, the high pass filter comprises a shunt capacitor. In some implementations, the system includes a transient voltage suppressor connected to each of the first portion of the standby supply regulator and the second portion of the standby supply regulator.

In some implementations, the integrated circuit comprises a wake-up circuit. In some implementations, the input voltage is at least an order of magnitude greater than the output voltage. In some implementations, the second portion of the standby supply regulator and the integrated circuit have an operational voltage limit less than the input voltage.

In another aspect, the present disclosure is directed to a method for integrated battery supply regulation. The method includes receiving, by a standby supply regulator comprising a first portion external to an integrated circuit and a second portion internal to an integrated circuit, a current flow from a power supply at a first voltage; providing, by the second portion of the standby supply regulator, a first portion of the current flow to the integrated circuit at a second voltage; and adjusting, by the second portion of the standby supply regulator, a second portion of the current flow. The first portion of the standby supply regulator dissipates an amount of power proportional to the current flow multiplied by a difference between the first voltage and the second voltage.

In some implementations, the first portion of the standby supply regulator comprises a resistor. In some implementations, adjusting the second portion of the current flow includes: increasing the second portion of the current flow to reduce the second voltage, or decreasing the second portion of the current flow to increase the second voltage.

It should be noted that certain passages of this disclosure may reference terms such as "first" and "second" in connection with devices, mode of operation, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A system for integrated battery supply regulation, comprising:
 a standby supply regulator configured to receive an input voltage from a power supply and provide an output voltage to an integrated circuit, wherein the standby supply regulator comprises:
  a first portion of the standby supply regulator that is external to the integrated circuit, and
  a second portion of the standby supply regulator that is internal to the integrated circuit, the second portion of the standby supply regulator receiving current flow from the first portion of the standby supply regulator,
 wherein the second portion of the standby supply regulator comprises a voltage regulator configured to selectively adjust the current flow received from the first portion of the standby supply regulator,
 wherein a first portion of the current flow through the first portion of the standby supply regulator is selectively provided to the integrated circuit at the output voltage to a supply node of the integrated circuit, and
 wherein a second portion of the current flow through the second portion of the standby supply regulator is provided through the second portion of the standby supply regulator and is not provided across the supply node by a first circuit.

2. The system of claim 1, wherein the second portion of the standby supply regulator comprises a shunt voltage regulator.

3. The system of claim 1, wherein the second portion of the standby supply regulator is configured to increase current flow through the first portion of the standby supply regulator to reduce the output voltage to the integrated circuit.

4. The system of claim 1, wherein the second portion of the standby supply regulator is configured to decrease current flow through the first portion of the standby supply regulator to increase the output voltage to the integrated circuit.

5. The system of claim 1, wherein the second portion of the standby supply regulator is configured to selectively adjust the second portion of the current flow through the second portion of the standby supply regulator.

6. The system of claim 1, wherein the first portion of the standby supply regulator comprises a resistor.

7. The system of claim 6, wherein the resistor is configured to dissipate an amount of power proportional to a difference between the input voltage and the output voltage.

8. The system of claim 1, wherein the second portion of the standby supply regulator comprises a voltage reference circuit and a voltage divider, and a differential amplifier.

9. The system of claim 8, wherein the second portion of the standby supply regulator further comprises a current bypass shunt controlled by the differential amplifier.

10. The system of claim 1, further comprising a low pass filter connected to the first portion of the standby supply regulator.

11. The system of claim 10, wherein the low pass filter comprises a shunt capacitor.

12. The system of claim 1, further comprising a transient voltage suppressor connected to each of the first portion of the standby supply regulator and the second portion of the standby supply regulator.

13. The system of claim 1, wherein the integrated circuit comprises a wake-up circuit.

14. The system of claim 1, wherein the input voltage is at least an order of magnitude greater than the output voltage.

15. The system of claim 1, wherein the second portion of the standby supply regulator and the integrated circuit have an operational voltage limit less than the input voltage.

16. A method for integrated battery supply regulation, comprising:
   receiving, by a first portion of a standby supply regulator, a current flow from a power supply at a first voltage, the first portion of the standby supply regulator being external to an integrated circuit;
   receiving, by a second portion of the standby supply regulator that is internal to the integrated circuit, the current flow from the first portion of the standby supply regulator;
   adjusting, by a voltage regulator of the second portion of the standby supply regulator, the current flow received from the first portion of the standby supply regulator;
   providing, by the second portion of the standby supply regulator, a first portion of the current flow to a supply input of the integrated circuit at a second voltage; and
   selectively providing, by a circuit of the second portion of the standby supply regulator, a second portion of the current flow through the second portion of the standby supply regulator and not to the supply input.

17. The method of claim 16, wherein the first portion of the standby supply regulator comprises a resistor, and wherein the first portion of the standby supply regulator dissipates an amount of power proportional to the current flow multiplied by a difference between the first voltage and the second voltage.

18. The method of claim 16, wherein adjusting the second portion of the current flow comprises:
   increasing the second portion of the current flow to reduce the second voltage, or
   decreasing the second portion of the current flow to increase the second voltage.

19. A system comprising:
   a printed circuit board (PCB) configured to receive an input voltage from a power supply and provide an output voltage for an integrated circuit, wherein the PCB comprises:
      a first portion of the PCB that is external to the integrated circuit; and
      a second portion of the PCB that is internal to the integrated circuit, the second portion of the PCB receiving current flow from the first portion of the PCB,
      wherein a voltage regulator of the second portion of the PCB is configured to selectively adjust the current flow received from the first portion of the PCB to provide the output voltage,
      wherein a first portion of the current flow through the first portion of the PCB is provided to a supply input of the integrated circuit, and
      wherein a second portion of the current flow through the second portion of the PCB is selectively provided by a circuit through the second portion of the PCB and avoiding the supply input of the integrated circuit.

20. The system of claim 19, wherein the second portion of the PCB is configured to selectively adjust the second portion of the current flow through the second portion of the PCB.

* * * * *